(12) United States Patent
Herberger et al.

(10) Patent No.: US 8,918,715 B2
(45) Date of Patent: Dec. 23, 2014

(54) SYSTEM AND METHOD FOR GENERATING STEREOSCOPIC 3D MULTIMEDIA WORKS FROM 2D INPUT MATERIAL

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 0 days.

(21) Appl. No.: 13/298,081

(22) Filed: Nov. 16, 2011

(65) Prior Publication Data

US 2012/0304109 A1 Nov. 29, 2012

Related U.S. Application Data

(60) Provisional application No. 61/414,211, filed on Nov. 16, 2010.

(51) Int. Cl.
| | | |
|---|---|---|
| *G06F 17/00* | (2006.01) | |
| *G06T 19/20* | (2011.01) | |
| *G06F 17/30* | (2006.01) | |
| *H04N 13/00* | (2006.01) | |
| *H04N 13/02* | (2006.01) | |
| *G11B 27/034* | (2006.01) | |
| *G11B 27/34* | (2006.01) | |
| *G06F 17/21* | (2006.01) | |
| *G06F 3/0346* | (2013.01) | |
| *G06F 3/0354* | (2013.01) | |

(52) U.S. Cl.
CPC ............ *G06T 19/20* (2013.01); *G06F 17/3005* (2013.01); *G06F 17/30061* (2013.01); *H04N 13/004* (2013.01); *H04N 13/026* (2013.01); *G11B 27/034* (2013.01); *G11B 27/34* (2013.01); *G06F 17/212* (2013.01); *G06F 3/0346* (2013.01); *G06F 3/0354* (2013.01); *G06F 17/30126* (2013.01); *G06T 2200/24* (2013.01); *G06T 2219/2004* (2013.01)
USPC ........... 715/273; 715/716; 715/764; 715/782; 715/757; 715/836; 715/852

(58) Field of Classification Search
CPC ............ G06F 17/212; G06F 17/30126; G06F 3/0346; G06F 3/0354
USPC .................. 715/273, 716–764, 782, 836, 852
See application file for complete search history.

(56) References Cited

U.S. PATENT DOCUMENTS

| | | |
|---|---|---|
| 6,177,953 B1 | 1/2001 | Vachette et al. |
| 6,248,944 B1 | 6/2001 | Ito |
| 6,285,371 B1 | 9/2001 | Gould et al. |
| 6,931,070 B2 | 8/2005 | Moore |
| 7,002,583 B2 | 2/2006 | Rabb, III |
| 7,148,908 B2 | 12/2006 | Riek et al. |
| 7,321,374 B2 | 1/2008 | Naske |
| 7,379,065 B2 | 5/2008 | Rabb, III |
| 7,468,735 B2 | 12/2008 | Larsen et al. |
| 2002/0010655 A1* | 1/2002 | Kjallstrom ...................... 705/27 |

(Continued)

*Primary Examiner* — Quoc A Tran
(74) *Attorney, Agent, or Firm* — Fellers, Snider, Blankenship, Bailey & Tippens, P.C.; Terry L. Watt

(57) ABSTRACT

According to a preferred aspect of the instant invention, there is provided a system and method that allows the user to present standard 2D multimedia data (photo, video) to an audience in a stereoscopic 3D presentation. The system allows the user to transfer standard 2D multimedia content into a stereoscopic 3D multimedia work by automatically placing the individual 2D multimedia input material into specific placeholder sections in specially prepared and provided S3D multimedia themes.

15 Claims, 3 Drawing Sheets

(56) References Cited

U.S. PATENT DOCUMENTS

| | | | |
|---|---|---|---|
| 2005/0081161 A1* | 4/2005 | MacInnes et al. | 715/765 |
| 2006/0209061 A1 | 9/2006 | Burch et al. | |
| 2006/0217979 A1* | 9/2006 | Pahud et al. | 704/257 |
| 2008/0143727 A1 | 6/2008 | Oh et al. | |
| 2009/0195641 A1 | 8/2009 | Neuman | |
| 2009/0262116 A1 | 10/2009 | Zhao et al. | |
| 2009/0289941 A1 | 11/2009 | Davidson et al. | |
| 2010/0142801 A1 | 6/2010 | Koppal et al. | |

* cited by examiner

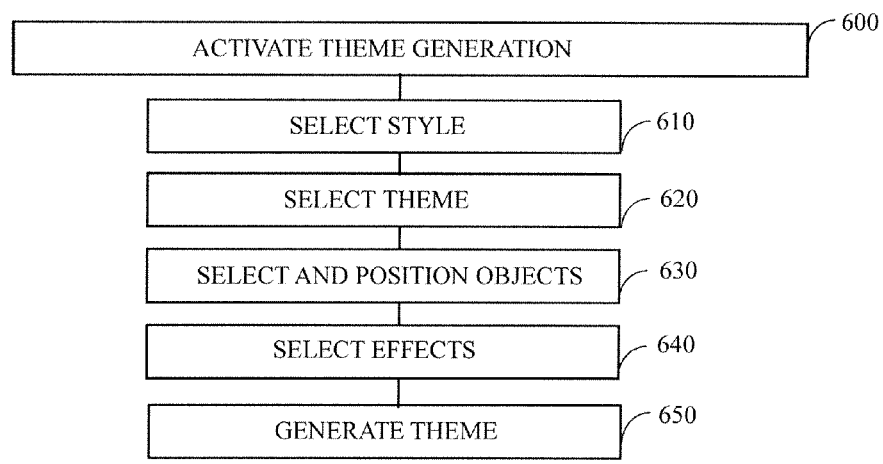
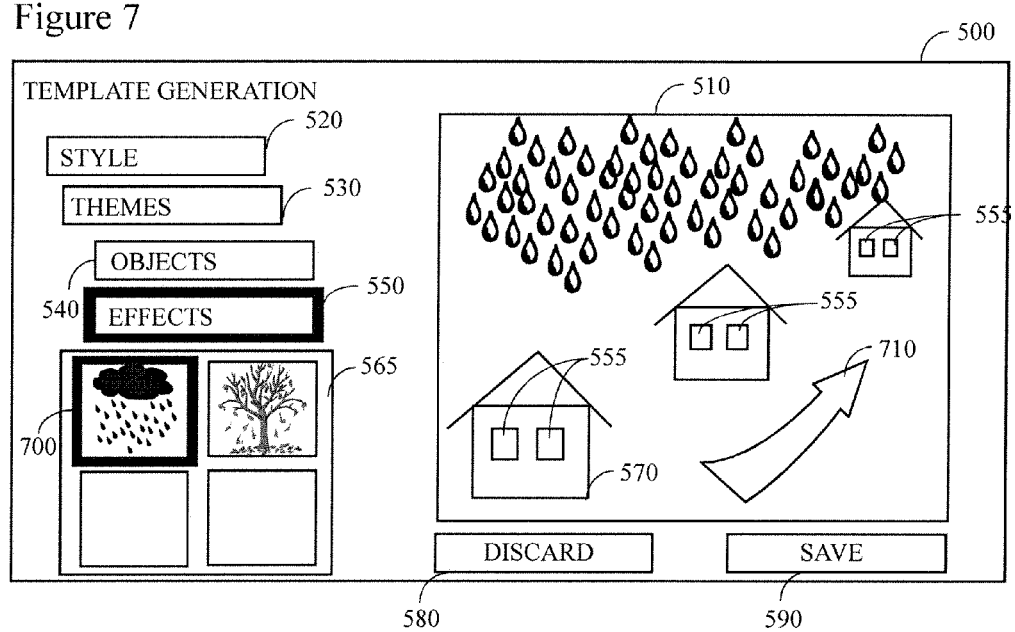

SYSTEM AND METHOD FOR GENERATING STEREOSCOPIC 3D MULTIMEDIA WORKS FROM 2D INPUT MATERIAL

This application claims the benefit of U.S. Provisional Patent Application Ser. No. 61/414,211 filed on Nov. 16, 2010 and incorporates said provisional application by reference into this document as if fully set out at this point.

FIELD OF THE INVENTION

The present invention relates generally to the field of multimedia editing and, more generally, to editing multimedia works where generic 2D input material is integrated and transformed into a stereoscopic 3D multimedia experience.

In recent years stereoscopic 3D technology in the entertainment industry has experienced an enormous growth. Hollywood has led the way with the release of numerous first-run blockbusters in the stereoscopic 3D ("S3D", hereinafter) format. Predictably, users who viewed this technology in the theater have become increasingly receptive to the idea of having this same experience in their own homes. This has produced a demand for in-home equipment that can read and play stored S3D material. Further, the rising popularity of stereoscopic 3D has encouraged the industry to begin delivering S3D ready computer display and TVs. In addition, digital photo and video cameras have been developed so that consumers could create and experience their own S3D content at home.

However most users have large accumulated numbers of 2D digital photos, videos, etc., that are not viewable in 3D. As a partial solution to this common quandary, a number of S3D capable display devices have been developed that have the ability to calculate S3D compatible data from 2D input material so that the 2D material can be viewed in 3D. However this functionality has its flaws, among which are that its quality is heavily dependent upon the input material, sometimes providing great S3D visuals, and other times not.

Thus, what is needed is a system and method that allows a user to experience his or her 2D image and video data in stereoscopic 3D without the problems of the existing 2D to S3D conversion methods. The needed system and method will provide the user with an efficient, simple and quick solution to select generic 2D input material and integrate and use it in a S3D environment.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the various problems associated with existing 2D to S3D conversion methods.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for generating stereoscopic 3D multimedia works by using 2D input material which does not apply a mathematical transformation to the 2D input material.

In the preferred embodiment, the instant invention will provide the user with a number of different themes and styles from within a multimedia editing program. These themes and styles will represent specially designed S3D templates that have placeholders for 2D input material.

In a preferred arrangement, a user will select and import 2D material, preferably digital photos, or other images into the multimedia editing software. The imported digital images will then be sorted and provided to the user for selection. The user will then be readily able to compile a selection of the digital images which he or she would like to integrate into the S3D display or presentation.

After the user has selected an S3D template, the instant invention will next preferably automatically generate a S3D presentation, according to the specification and layout of the selected template, by integrating the selected 2D input material into the template. After the presentation has been generated, the user will be able to view the presentation, preferably on a S3D capable display screen. Additionally, and in another preferred embodiment, the user will also be able to generate and edit S3D themes by using programmer-provided objects and effects via a graphical WHYSIWYG (i.e., "what you see is what you get") user interface.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 6 depicts a preferred workflow associated with the theme generation process of the instant invention.

FIG. 7 depicts a preferred screen display associated with one component of the instant invention after application of a "rain" effect.

DESCRIPTION OF THE PREFERRED EMBODIMENTS

Figure 1:
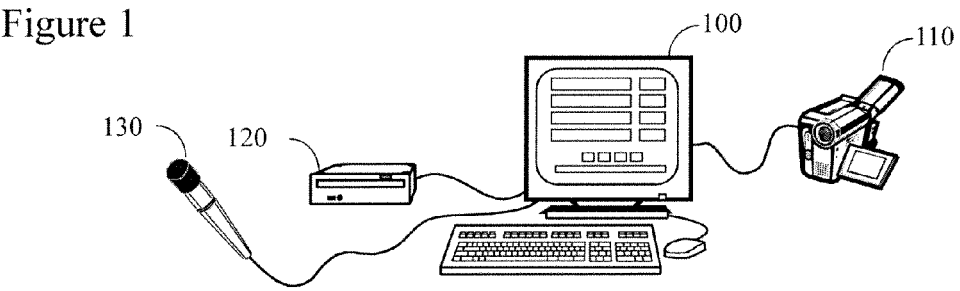
FIG. 1 depicts a preferred general working environment of the instant invention.

Referring now to the drawings, wherein like reference numerals indicate the same parts throughout the several views, there is provided a preferred system and method for generating a stereoscopic 3D multimedia experience from 2D input material.

As is generally indicated in FIG. 1, at least a portion of the instant invention will be implemented in form of software running on a user's computer 100. Such a computer will have some amount of program memory and hard disc storage (whether internal or accessible via a network) as is conventionally utilized by such units. Additionally it is possible that an external camera 110 of some sort will be utilized with— and will preferably be connectible to—the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally a microphone 130 might be utilized so that the user can add voice-over narration to a multimedia work or can control his or her computer via voice-recognition software and additionally a CD or DVD burner 120 could be useful for storing content on writable or rewritable media.

The methods of the instant invention will preferably supplement, support and enhance the well-known procedures that are traditionally used when editing and working with digital material like photos and videos. The instant invention will preferably operate as an adjunct to the already substantial functionalities that are typically found in multimedia editing software to provide the user with an option to present standard 2D multimedia data (photo, video) to an audience in a stereoscopic 3D presentation. The instant approach allows the user to continue to work with video and images in an unrestricted manner, but provides the additional capability of utilizing S3D with 2D multimedia data.

Figure 2:
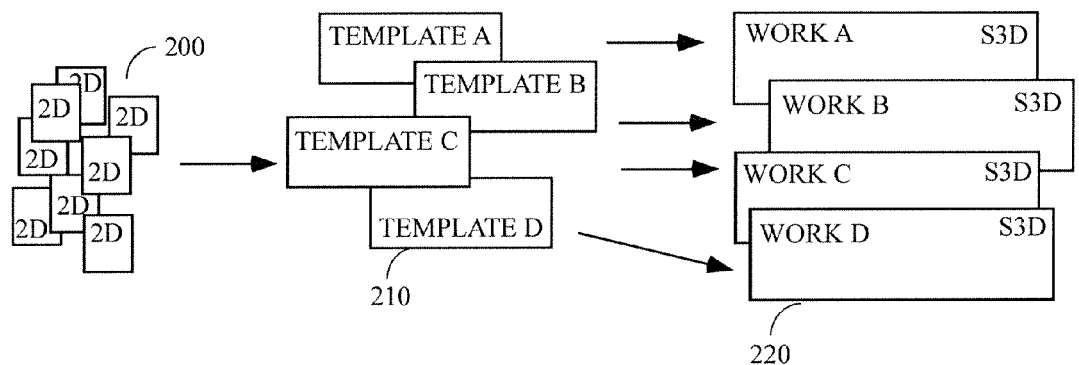
FIG. 2 illustrates an overview of some preferred individual components of the instant invention.

Turning next to FIG. 2, the present invention preferably begins with the selection of 2D input material. The input material will preferably be standard 2D material 200, e.g., old family photos, vacation photos, or conventional videos. Then the user will preferably be able to select a S3D theme or template from a number of S3D themes 210 or templates that have been previously created. These S3D themes or templates will preferably be provided to the user as standard content of the multimedia editing software. Additionally, it might also be possible that the user will be able to receive new themes over the Internet or other venues.

The provided themes will be S3D compatible presentations, e.g., video sequences that are styled to resemble books, galleries, collages, etc., which are presented in full S3D with a number of possible S3D features (e.g., elements moving towards the viewer, etc.) and into which the user's 2D material will be automatically added and adapted. For example, a gallery theme could offer the user a virtual picture gallery in full S3D setup wherein the user's 2D material would be placed within the exhibits hanging on the walls and a viewing user would be automatically moved through the 3D gallery while observing the 2D material. As another example, 2D pictures could be inserted into a forest scene where leaves are swirling around them (in 3D). Some of the leaves might pass in front of the pictures, giving the impression that they are "in" the 3D scene. However, the user-provided material will be a conventional 2D multimedia item. Additionally, and continuing with the previous example, the leaves themselves might be placeholders for 2D media items (e.g., the user might be able to replace some number of the leaves with 2D media items that would then move like leaves in 3D through the scene). In yet another example, a 3D image of a lake might be shown to the user. Then, as stones are thrown into that body of water, the water will splash toward the viewer in 3D, with each water splash leaving behind a bubble in which a user-selected 2D picture will be displayed.

Continuing with the discussion of FIG. 2, after the S3D theme has been selected the instant invention will preferably automatically insert the selected 2D material into the designated placeholders of the S3D theme and will then generate the S3D presentation 220 according to methods well known to those of ordinary skill in the art (e.g., using anaglyphic, polarization, eclipse or other S3D technologies). It will, however, preferably also be possible for the user to manually insert the 2D materials into the S3D theme at locations of his or her own choosing.

In another preferred embodiment the user will be able to generate S3D Themes by him- or herself for a later selection and insertion of 2D media therein. The theme generation process will preferably allow the user to select specific building blocks provided as a part of the multimedia editing program. The user will preferably be able to build a customized theme in a somewhat extended what-you-see-is-what-you-get environment which provides a simulated S3D view. That will allow the user to position the building blocks in 3D, rearrange them and select additional S3D graphic effects. For example the user might be able to select and position separate houses in a landscape background, with the houses being positioned by the user in different levels in relation to the front to give the S3D theme depth. The placeholders for the 2D images will preferably be specifiable by the user and might include, for example, the roof shingles, or the window shutters. Another example of a S3D effect which could be added by the user would be rain or falling leaves.

After the user has selected the individual components of the S3D effect, the instant invention will preferably generate a S3D template selectable for later use.

Figure 3:
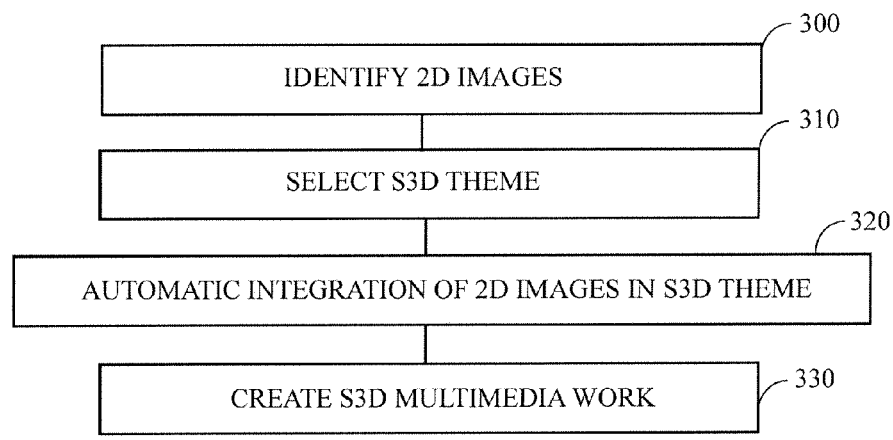
FIG. 3 illustrates some preferred principal steps in =the workflow of the instant invention.

Turning next to FIG. 3, this figure illustrates a condensed version of a preferred workflow of the S3D creation process of the instant invention. In a first preferred step, the user will select the 2D images that he or she wants to integrate into the S3D multimedia work 300. The 2D images might be stored on the users computer, (e.g., RAM, magnetic disk, solid state drive, etc.) or on a remotely situated computer that is accessible via a network, or they might be stored on a removable computer readable medium (e.g., a thumb drive, SD card, etc.) that the user inserts into the computer, etc.

In a next preferred step the user will preferably select a S3D theme from among the available S3D themes 310 provided. These themes will typically have been provided by the instant inventors, although in some preferred arrangements the theme might have been created by the end-user or some other individual. In some embodiments the user will be able to access new themes regularly, via, for example, the Internet.

In the next preferred step the instant invention will preferably automatically insert the selected 2D images into the selected S3D theme 320. Such a S3D theme will typically have predefined insertion points or locations for 2D multimedia items into which the user's images, video, etc., will be inserted. In other cases, the user will be able to specify an automatic insertion mode, e.g., random or sequential. Additionally in some instances the user might be able to manually insert images into the theme and/or he or she might be able to rearrange the images after insertion.

After the insertion of the 2D images into the selected S3D theme, the instant invention will create the S3D multimedia work 330, which preferably will take the form of a video file, that can than be played by the user on a suitable 3D display device.

Figure 4:
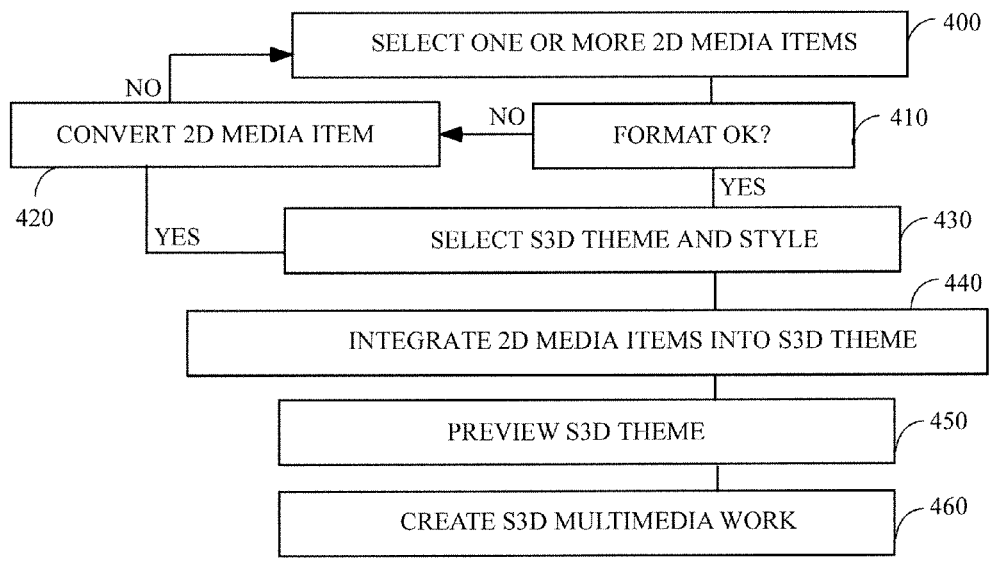
FIG. 4 depicts a more detailed workflow suitable for use with the instant invention.

Turning next to FIG. 4, this figure illustrates in greater detail a preferred workflow of the instant invention. The example workflow contained in this figure begins with the selection of one or more 2D media items by the user 400. As a part of the next preferred step, the instant invention will check the 2D items to see if they are compatible with the instant invention 410, i.e., to determine whether or not they are suitable for insertion into any S3D theme. The compatibility check will preferably involve examining the graphical parameters or characteristics of the media file and determining, for example the resolution, the quality, the size of the selected 2D media item, etc. Then, as a specific example, if the resolution is too low, e.g., below a pixel rate of about 5 mega pixel/second, the media item will preferably be rejected, because the quality would not be appropriate for use with the S3D theme. Additionally the compatibility check will also preferably determine the type of the 2D image. If the check determines that the 2D images and/or video are compatible, the instant invention will preferably automatically prompt the user for the selection of a S3D theme 430. If the 2D images are not compatible, e.g., of the wrong file type, the instant invention will preferably initiate an automatic conversion of the 2D media items 420 to make them compatible with the S3D theme (e.g., sized properly, having the right bit depth, correct frame rate, etc.). If this conversion is unsatisfactory the instant invention will preferably allow the user to select another media item or items (step 400). If the conversion is satisfactory, the instant invention will preferably allow the user to select a S3D theme 430.

After the S3D theme has been selected, the instant invention will preferably automatically insert the 2D images into the S3D theme 440 as has been previously described. Next, the instant invention will preferably allow the user to preview the S3D theme 450, with the preview preferably being in S3D if the user's hardware will support that sort of scheme. If the preview is acceptable to the user, the instant invention will then preferably create the S3D multimedia work 460, which will preferably be generated as a video file for playback by the user.

Figure 5:
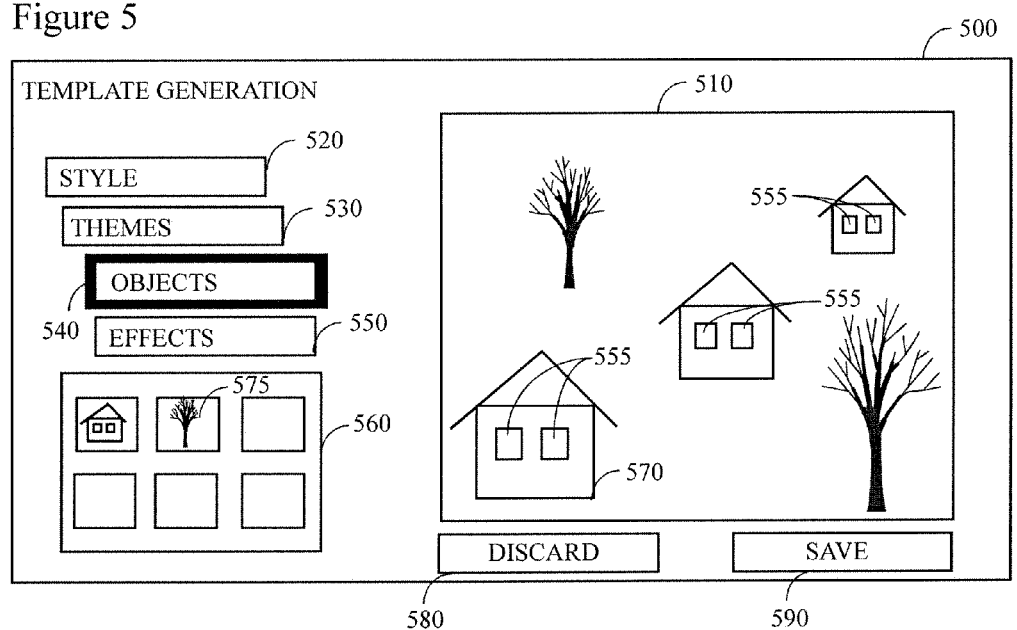
FIG. 5 illustrates a preferred graphical user interface associated with theme generation.

Turning next to FIG. 5, this Figure illustrates the preferred graphical user interface of a different aspect of the instant invention, which is designed to allow the user to generate S3D templates by him- or herself. In the preferred arrangement, the graphical user interface provides a selection of options similar to those depicted in FIG. 5, and might comprise, by way of example only, a computer window 500 that provides a number of different selection options and information sections.

In the example of FIG. 5, preview and work sections 510 occupy a substantial part of the window 500. In the preferred embodiment this will provide the user with the option to preview the S3D theme during the generation phase. The user will preferably be able to select a specific style 520 of theme. Examples of the sorts of general styles that might be provided include Nature, Sports and Automobiles. When the "Themes" option 530 is selected, the selection options 540 and 550 will preferably be displayed, with the particular themes that are displayed preferably being a function of the style (general category) selected previously. In the preferred variation, the objects and effects menus 540 and 550 will provide access to a number of style-specific objects that might be selectable by the user. The selectable objects will preferably be displayed in a predetermined section of the graphical user interface 560 (for objects) and 565 (for effects, FIG. 7).

The user will preferably be allowed to select objects from among those provided and to position them within the preview and work section via drag and drop interaction. The user will preferably not be limited in the number and type of objects that can be selected.

The selectable objects might be, as is generally illustrated in the current example, houses with placeholders 555 for 2D media items, or they might be ships or boats that are positionable within a river or ocean scene based style setting, etc. In some cases, additional/graphics that do not incorporate a 2D placeholder might be provided to allow the user to further customize the theme (e.g., the tree icon 575 in FIG. 5).

The sorts of effects that might be provided to the user will preferably be effects that affect the whole screen and are preferably S3D effects, like rain, snow or water splashes. In some preferred embodiments, the user might be able to also add placeholders to specific sections of the S3D effects. The work and preview screen 510 will preferably allow the user to take control of the generation process. After the user is satisfied with the current state of the theme, he or she will preferably be able to save the theme 580 to attached or remote nonvolatile storage. Alternatively, the user will preferably be supplied with a program option that allows the current theme to be discarded 590, after which the user will be allowed to start the creation process again.

Coming next to FIG. 6, this figure illustrates a preferred workflow associated with the theme generation process of the instant invention. In a first preferred step the user will activate the theme generation process 600. In response to a selection of this program option, the instant invention will preferably provide the user with a graphical user interface that is designed to implement the visual theme generation process. The user will then preferably select a style 610 from among the different styles provided, after which the user will be allowed to construct a custom theme using the tools provided.

Alternatively the user might be permitted to select a pre-existing editable theme 620 to use as a starting point in building his or her own theme. Note that selection of both a style and theme is optional, and in many cases, the user will simply select a template, accept its default style and theme, and begin editing. Next, and preferably as a component of the theme generation process, the user might be provided with the option of selecting and positioning objects 630 that are specific to or otherwise customized so as to be consistent with the selected style. These objects could be any number of inanimate objects for example stones, houses, banners, leaves of a tree, etc.

Additionally, the objects that are offered for selection could be animated (e.g., a tree blowing in the wind, a barking dog, a jogger running up a path away from or toward the camera view point, etc.). Further, in some embodiments the user will be presented with the option of adding 3D objects to the theme. These might be objects that are defined in 3D space so that when the camera viewpoint circles around (or above/below) them they potentially have a different appearance from each angle.

Still further, in some embodiments the user will preferably be able to select one or more (preferably full-screen) effects 630 for integration into the theme. After the user has selected and positioned the on-screen objects and selected one or more associated effects, if the user is satisfied with the result the instant invention will generate the theme (step 650).

Turning next to FIG. 7, this figure depicts a preferred screen display associated with an aspect of the instant invention as it might appear after the "effects" option has been selected (menu item 550) and a "rain" effect has been applied. In this figure the user has opted to apply a full-screen effect to the S3D theme. In this example, the user has selected a rain effect 700 which will preferably then be automatically added to the preview section of the display so that the user can determine if the result is acceptable 710. The sorts of full-screen effects that might be provided could include effects that resemble weather events, like rain, wind, fog, or snow, (e.g., nature effects) or effects that provide particles moving in and out of the negative space (particle effects). Other choices might include a firefly effect or a beam of light of a lamp. In some embodiment, various parameters related to a chosen effect might be adjustable by the user (e.g., the rain or snow flake density or intensity/falling speed, the size of the drops or flakes, etc.). Additionally it might also be possible that effects would be selectable that mimic screen damaging effects (e.g., "screen effects" such as water or snow "impacting" against on the glass of the screen, video "cracks" in the screen, video dust/dirt, etc.).

Finally, in this particular example the user has been provided with a visual representation of a path 710 that will be followed through the virtual 3D world of this theme during the rendering process. That is, in some embodiments the user will be able to create or modify a customized path and/or accept or edit an exiting path that was provided the software developer. This sort of virtual movement might be useful if, for example, the 3D viewpoint in the rendered S3D video were moved from house-to-house (in the example of F*igure* 710) and the movement was paused to look in each window, wherein a 2D image or video would be placed into the placeholders 555 provided.

In summary, the instant invention provides a highly efficient method of multimedia editing that allows a user to create S3D presentations from 2D source material. Preferably, the main steps will be automated, thereby reducing the involvement of the user when editing and generating a S3D multimedia work.

CONCLUSIONS

Of course, many modifications and extensions could be made to the instant invention by those of ordinary skill in the art. For example, in one preferred embodiment the user will be able to select not only digital photo or video material but also audio material as input to the instant method. In this embodiment, the S3D themes will feature placeholder sections for audio material, which will allow further customization of the S3D presentation.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method for generating a stereoscopic 3D multimedia work from at least one item of 2D input material, comprising the steps of:
 (a) accessing computer storage wherein is stored at least one stereoscopic 3D theme, each of said at least one stereoscopic 3D themes having a predetermined number of 2D placeholders associated therewith;
 (b) receiving a selection from a user of at least one stereoscopic 3D theme from among said at least one stored stereoscopic 3D themes, said selected stereoscopic 3D theme having a plurality of 2D placeholders associated therewith;
 (c) selecting at least two 2D digital media items;
 (d) assigning each of said at least two selected 2D digital media items to a different one of said plurality of 2D placeholders associated with said selected stereoscopic 3D theme;
 (e) creating a stereoscopic 3D multimedia work from said selected stereoscopic 3D theme and said assigned at least two selected 2D digital media items;
 (f) selecting at least one stereoscopic 3D nature effect for application to said selected stereoscopic 3D theme;
 (g) applying said selected stereoscopic 3D nature effect to said selected stereoscopic 3D theme, thereby generating said stereoscopic 3D multimedia work;
 (h) displaying said stereoscopic 3D multimedia work on a stereoscopic 3D display device.

2. The method according to claim 1, wherein each of said at least one stereoscopic 3D nature effect is selected from the group consisting of a falling snow effect, a rain effect, a fog effect, and a wind effect.

3. The method according to claim 1, wherein step (d) comprises the step of randomly assigning each of said at least two selected 2D digital media items to a different one of said plurality of 2D placeholders associated with said selected stereoscopic 3D theme.

4. The method according to claim 1, wherein step (d) comprises the step of assigning in a sequential order each of said at least two selected 2D digital media items to a different one of said plurality of 2D placeholders associated with said selected stereoscopic 3D theme.

5. The method according to claim 1, wherein each of said at least two 2D media items is selected from a group consisting of a 2D image and a 2D video.

6. The method according to claim 1, wherein step (c) comprises the step of requiring the user to select at least two 2D digital media items.

7. A method for performing a stereoscopic 3D multimedia work, comprising the steps of:
 (a) providing a plurality of stereoscopic 3D themes;
 (b) selecting a stereoscopic 3D theme from among said plurality of stereoscopic 3D themes, said selected stereoscopic 3D theme having a plurality of 2D placeholders associated therewith;
 (c) selecting a plurality of 2D digital media items;
 (d) adapting a format of each of said selected plurality of 2D images to a format compatible with selected stereoscopic 3D theme;
 (e) automatically inserting said selected 2D digital media items into said placeholders of said selected stereoscopic 3D theme;
 (f) generating said stereoscopic 3D multimedia work from said selected stereoscopic 3D theme and said inserted 2D digital media items;
 (g) selecting at least one stereoscopic 3D nature effect for application to said selected stereoscopic 3D theme;
 (h) applying said selected stereoscopic 3D nature effect to said selected stereoscopic 3D theme, thereby creating said stereoscopic 3D multimedia work;
 (i) storing said stereoscopic 3D multimedia work in a computer readable format;

(j) accessing said stored stereoscopic 3D multimedia work; and, (k) performing said accessed stereoscopic 3D multimedia work on a stereoscopic 3D device for at least one user.

8. The method according to claim 7, wherein step (d) comprises the steps of:
   (i) determining a file type of each of said selected 2D digital media items,
   (ii) determining at least one graphical parameter of each of said selected 2D media items,
   (iii) determining at least one graphical requirement of said selected stereoscopic 3D theme corresponding to each of said determined graphical parameter of each of said selected 2D media items, and,
   (iv) changing at least one of said at least one graphical parameter of said each of said selected 2D media items to match said corresponding determined graphical requirement of said selected stereoscopic 3D theme.

9. The method according to claim 8 wherein said at least one of said graphical parameter of said selected 2D digital media item is selected from a group consisting of a resolution, a file size, a pixel size, a pixel density, and a video bit rate.

10. A method for generating a 3D multimedia work, comprising the steps of:
   (a) selecting a plurality of 2D digital media items;
   (b) selecting a stereoscopic 3D theme;
   (c) adapting a format of each of said selected 2D media items to a 2D format compatible with said selected stereoscopic 3D theme;
   (d) selecting a style for said selected stereoscopic 3D theme;
   (e) modifying said selected stereoscopic 3D theme according to said selected style;
   (f) choosing at least one 3D object for insertion into said selected stereoscopic 3D theme;
   (g) inserting said chosen at least one 3D object into said selected stereoscopic 3D theme;
   (h) positioning said selected at least one stereoscopic 3D object in said selected stereoscopic 3D theme;
   (i) selecting at least one stereoscopic 3D nature effect for application to said selected stereoscopic 3D theme;
   (j) applying said selected stereoscopic 3D nature effect to said selected stereoscopic 3D theme;
   (k) identifying at least one 2D placeholder within said selected stereoscopic 3D theme;
   (l) automatically inserting said selected plurality of 2D digital media items into said determined placeholders of said selected stereoscopic 3D theme;
   (m) rendering said stereoscopic multimedia work using said plurality of 2D digital media items and selected stereoscopic 3D theme, thereby generating said 3D multimedia work; and,
   (n) displaying at least a portion of said 3D multimedia work for a user.

11. The method according to claim 10, wherein each of said at least one stereoscopic 3D object is an inanimate object.

12. The method according to claim 10, wherein said selected 3D effect is a full screen effect.

13. The method according to claim 10, wherein each of said at least one stereoscopic 3D nature effect is selected from a group consisting of a falling snow effect, a rain effect, a fog effect, and a wind effect.

14. A method for generating a stereoscopic 3D theme, comprising the steps of:
   (a) selecting a style;
   (b) selecting a theme associated with said style;
   (c) selecting a 2D placeholder;
   (d) positioning said 2D placeholder in the selected theme;
   (e) performing steps (c) and (d) at least once, thereby selecting at least one 2D placeholder;
   (f) selecting a stereoscopic 3D object;
   (g) positioning the stereoscopic 3D object in the selected theme;
   (h) performing steps (f) and (g) at least twice, thereby selecting at least two stereoscopic 3D objects;
   (i) applying a stereoscopic 3D effect to said selected theme and to said at least one positioned 2D placeholders and said at least two positioned 3D objects to generate said stereoscopic 3D theme;
   (j) selecting at least one stereoscopic 3D nature effect for application to said selected stereoscopic 3D theme;
   (k) applying said selected stereoscopic 3D nature effect to said selected stereoscopic 3D theme, thereby generating said stereoscopic 3D theme;
   (l) storing said stereoscopic 3D theme in a computer readable medium.

15. The method according to claim 14, wherein each of said at least one stereoscopic 3D nature effect is selected from the group consisting of a falling snow effect, a rain effect, a fog effect, and a wind effect.

* * * * *